United States Patent [19]

Simmons

[11] Patent Number: 4,848,979

[45] Date of Patent: Jul. 18, 1989

[54] TOOL APPARATUS

[75] Inventor: Clayton Simmons, Bristol, Conn.

[73] Assignee: Kadan Enterprises, Inc., Newtonville, Mass.

[21] Appl. No.: 9,483

[22] Filed: Feb. 2, 1987

[51] Int. Cl.⁴ ............................................. B23B 31/10
[52] U.S. Cl. .................................... 407/103; 407/102; 407/110
[58] Field of Search .................... 30/329, 339; 407/91, 407/102, 103, 107, 109, 110

[56] References Cited

U.S. PATENT DOCUMENTS 1,009,352  11/1911  Stutzman ......................... 407/103 X
2,316,985  4/1943  Niedermayer ..................... 30/339 X
3,060,554  10/1962  Kirchner ......................... 407/107 X
3,137,918  6/1964  Breuning ......................... 407/109 X
4,243,348  1/1981  Paige .............................. 407/107 X Primary Examiner—Frank T. Yost
Assistant Examiner—Michael D. Folkerts
Attorney, Agent, or Firm—Wolf, Greenfield & Sacks

[57] ABSTRACT

A stick tool construction in which the cutting tip is easily and readily replaceable from the body. The cutting tip has a through hole and a fastening arrangement is provided passing through the hole in the tip. The fastening arrangement includes a cupped member supported by a spring on one side and a retaining screw on the other side of the body.

29 Claims, 3 Drawing Sheets

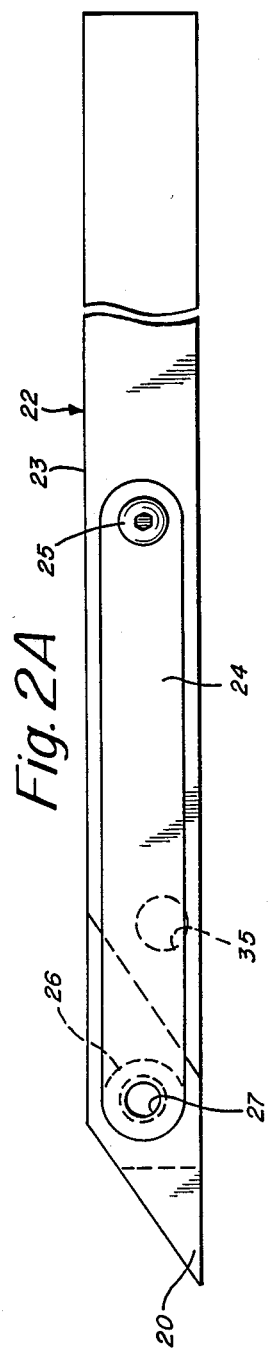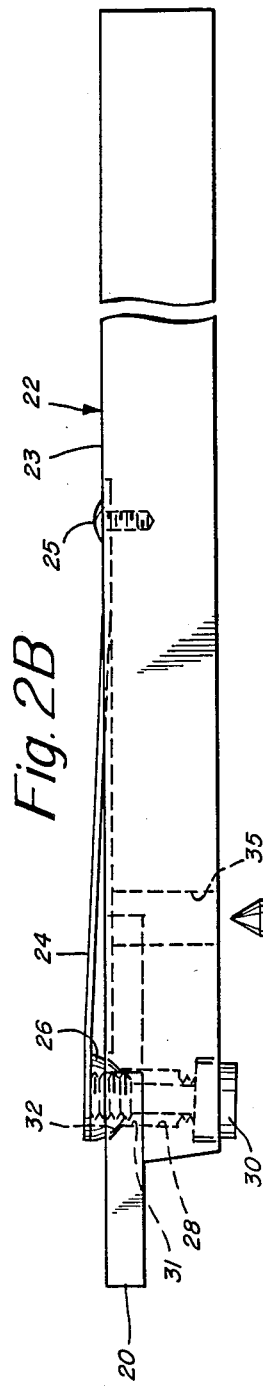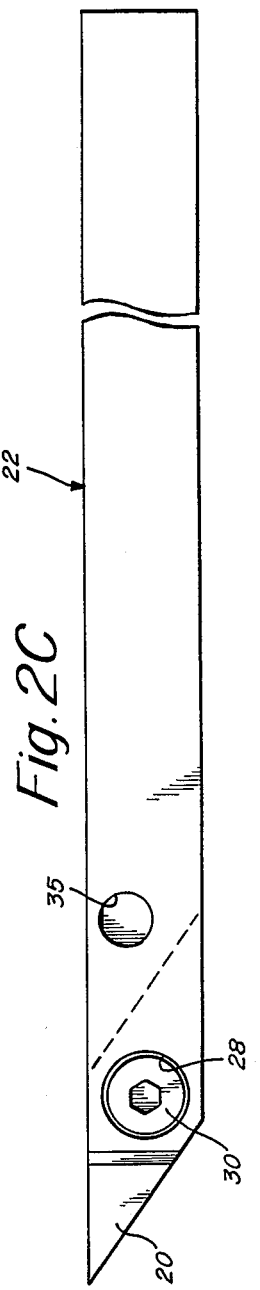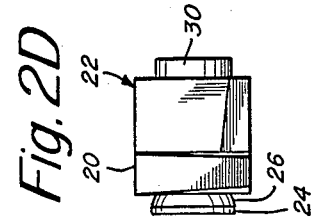

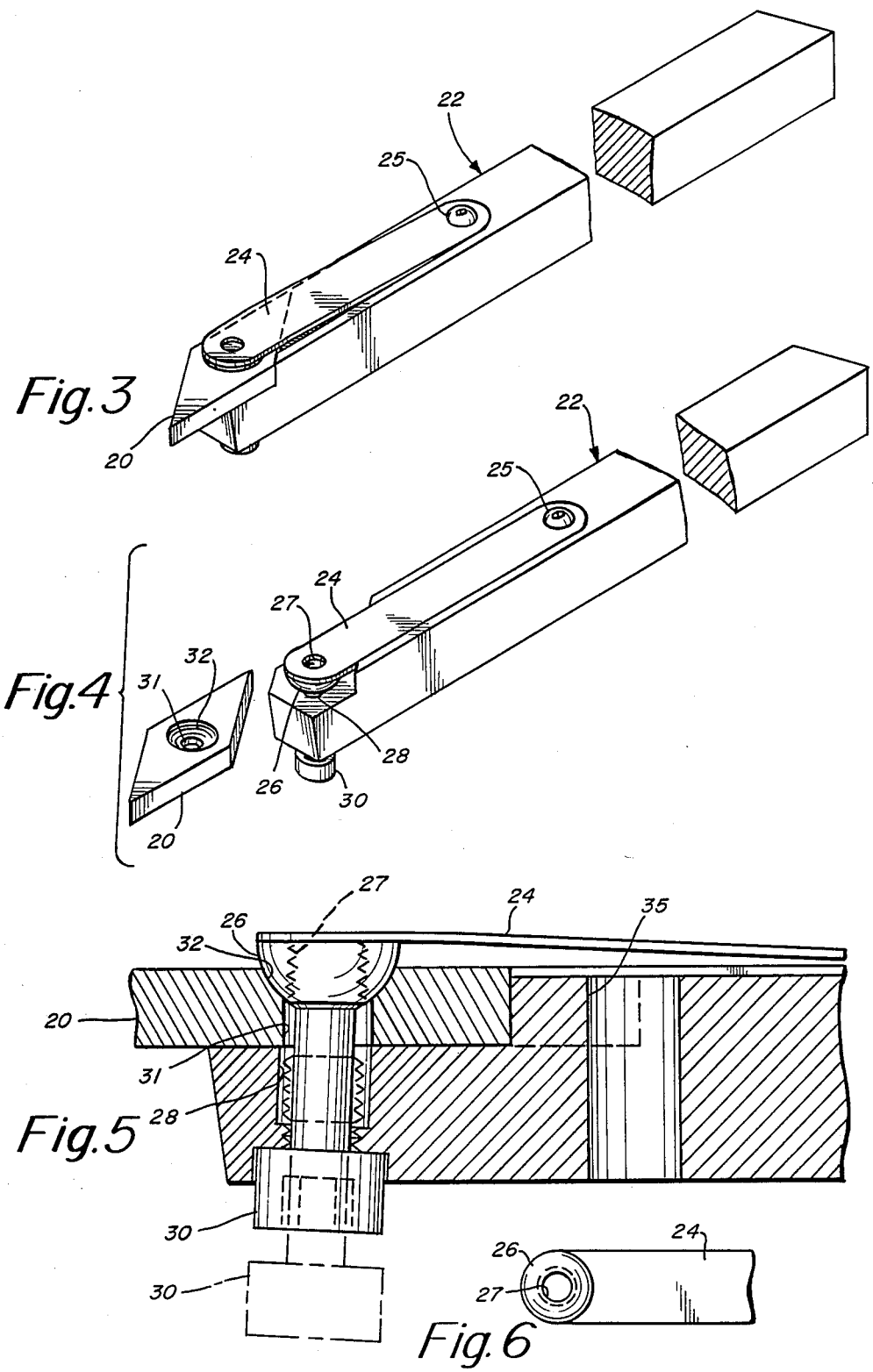

TOOL APPARATUS

BACKGROUND OF THE INVENTION

The present invention relates in general to a tool apparatus, and pertains, more particularly, to an improved holder for a tool, described herein in particular as a carbide cutting tool or cutting tip.

At the present time in Swiss automatic machines cutting tools are provided, typically referred to as "stick tools". These Swiss automatic machines may be used to form many different items and are used, for example, in the Swiss clock and watch field for making intricate watch and clock parts.

At the present time the "stick tool" that is employed is of the construction illustrated in FIGS. 1A and 1B herein. The tool is comprised basically of a holder body 10 that may be held in a conventional chuck and a carbide cutting tip 12. FIG. 1A shows the tip 12 exploded away from the body 10. FIG. 1B on the other hand shows the tip 12 in place in the body 10. The conventional technique is to secure the tip by braising such as indicated at 14 in FIG. 1B.

When the prior art tool had to be re-ground, parts of the body would be ground away to expose the tip and then the tip could be ground to the desired configuration. Typically, after some limited period of use, the entire body and tip were discarded. The entire prior art process of having to braise the tip and the regrinding made for a very time consuming, costly and complicated procedure for use of the stick tool.

Accordingly, it is an object of the present invention to provide an improved stick tool construction and one in which, in particular, the carbide tip is easily and readily replaceable in the body.

Another object of the present invention is to provide an improved tool apparatus particularly adapted for supporting a cutting tip and in which there is no requirement of braising of the tip to the holder.

A further object of the present invention is to provide an improved tool apparatus for in particular supporting a cutting tip which enables ready removal of the tip even in the relatively restricted operating dimensions inherent in these machines.

Still another object of the present invention is to provide an improved stick tool construction with a replaceable carbide or the like tip, which is very easy to use, which is relatively simple in construction, which can be fabricated relatively inexpensively, and which requires little or no maintenance.

SUMMARY OF THE INVENTION

To accomplish the foregoing and other objects, features and advantages of the invention there is provided an improved tool apparatus having a replaceable cutting tip. This apparatus comprises a solid body that is generally of elongated shape having opposite ends. One end is for support of the body such as in a conventional chuck and the other end is for supporting the cutting tip. This solid body also has opposite sides including means at one side for receiving the cutting tip. The cutting tip preferably has a through hole. Fastening means are provided passing through this hole and extending between the opposite sides of the body. The fastening means includes oppositely disposed mateable fastening members along with means for supporting one fastening member on one side of the body with the other fastening member adapted to mate with the one fastening member to retain the cutting tip in the body. The means for supporting the one fastening member preferably includes a spring-biased support means having one end fixed to the body and another free end at which the fastening member is supported. This means for supporting the one fastening member may be in the form of a deflectable cantilever member biased to urge the one fastening member against the cutting tip. The one fastening member and its associated support means are preferably formed unitarily. The one fastening member may comprise a cupped nut means. In this connection the cutting tip, preferably also has a cupped recess at the through hole for receiving the cupped nut means. In this way the one fastening member has a surface configuration adapted to mate with a similar surface configuration on the cutting tip. This provides for alignment of the cutting tip in the holder and also provides a means for retaining. The other fastening member comprises a screw means passing through the cutting tip hole to engage in the cupped nut means. The body preferably also has a passage between the opposite sides thereof for receiving a means, such as a pencil or other pointer to deflect the spring biased support means so as to enable ready removal of the tip once the fastening means is unfastened. A spring biased support means may be in the form of an elongated leaf secured by a rivet means at one end to the body. The cutting tip may be of various configuration such as of rectangular or diamond shape.

BRIEF DESCRIPTION OF THE DRAWINGS

Numerous other objects, features and advantages of the invention should now become apparent upon a reading of the following detailed description taken in conjunction with the accompanying drawings, in which:

FIG. 2A is a top plan view of a tool apparatus in accordance with the present invention;

FIG. 2B is a side elevation view of the tool apparatus of FIG. 2A;

FIG. 2C is a bottom view of the tool apparatus illustrated in FIGS. 2A and 2B;

FIG. 2D is an end view of the tool apparatus illustrated in FIGS. 2A-2C;

FIG. 3 is a perspective view of another embodiment of the tool apparatus of this invention illustrating a different configuration of a cutting tip;

FIG. 4 is a fragmentary perspective view illustrating further details of the tool illustrated in FIGS. 2A-2D;

FIG. 5 is a fragmentary cross-sectional view showing further details associated with the tool of FIGS. 2A-2D in FIG. 4; and FIG. 6 is a plan view of the biasing leaf illustrating the cupped nut means and the threaded hole into which the securing screw enagages.

DETAILED DESCRIPTION

Figure 1A:
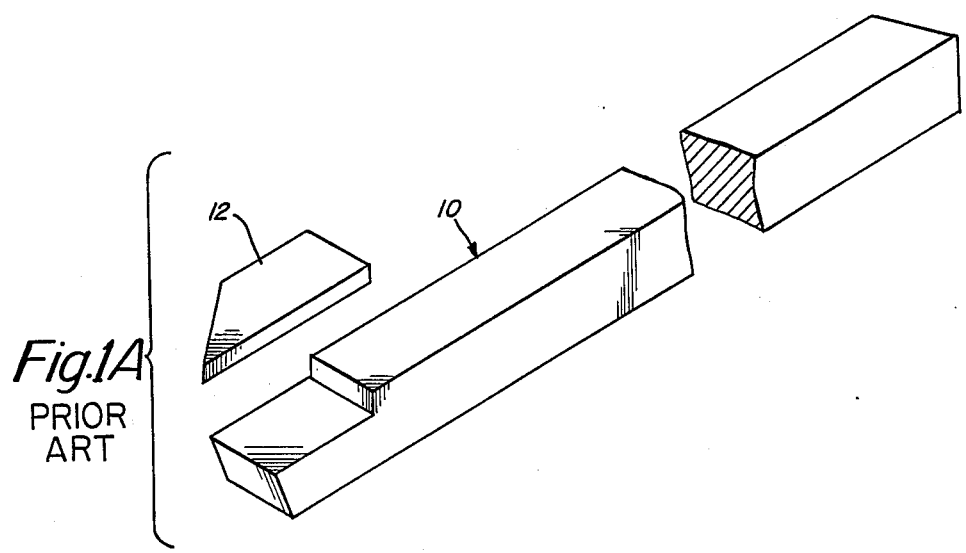
FIGS. 1A and 1B illustrate the prior art "stick tool" construction.
Figure 1B:
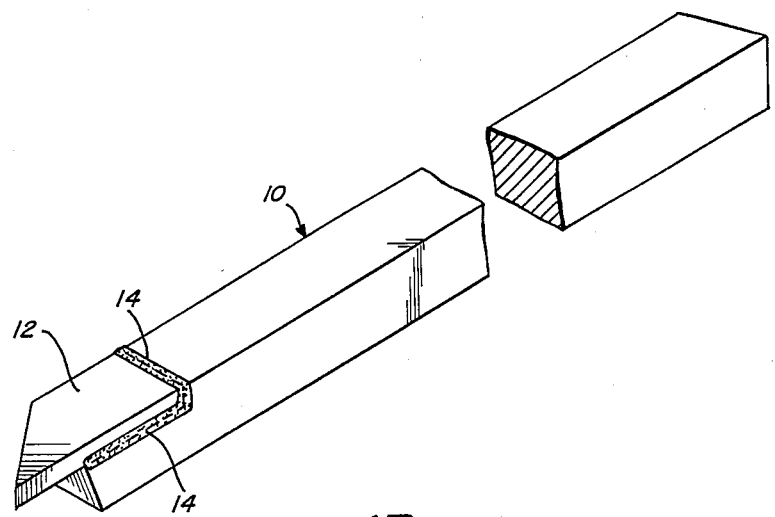

Reference is now made to FIGS. 2A-2D along with FIGS. 3-6. There is illustrated therein a preferred embodiment of the tool apparatus of the present invention. In FIGS. 2A-2D the apparatus is illustrated as supporting a diamond shaped insert or cutting tip. FIGS. 3-6 illustrate more of a rectangular shaped cutting tip. In the different views illustrated, like reference characters will be used throughout to identify like parts.

The apparatus comprises a cutting insert or tip 20 that is adapted to be easily and readily replaceable in the tool apparatus body 22. As indicated previously, in FIGS. 2A-2D the tip 20 is of diamond shape. At the top of the body 22 there is provided an elogated spring 24 that is fixedly secure at one end to one side of the body 22. FIGS. 2A nad 2B together clearly illustrate the configuration of the spring 24. It is secured to the surface 23 of body 22 by means of a rivet 25. FIG. 2D illustrates the cross-dimension of the body, which is preferably on the order of 5/16".

As illustrated in FIGS. 2A and 2B it is noted that the elongated, cantilever, spring leaf 24 has at its opposite end, supported therefrom, a solid cupped member 26. The member 26 has an internally threaded hole 27 such as illustrated in dotted outline in FIG. 5 and also in the underside view of FIG. 6. The allen screw 30 is adapted to engage in the threaded hole 27 as to be described in detail hereinafter.

In line with the cupped member 26, the body 22 is provided with a through hole 28 that is at least partially internally threaded to receive the screw 30. The end of the screw 30 engages in the threaded hole 27 in the cupped member 26. The screw 30 may be an allen head screw and may be of set screw or head screw type. In any event the screw 30 is adapted to pass through the tip 20 and engage with the cupped member 26. When the screw 30 is tightened the cupped member 26 tightly retains the tip in the proper position in the body. In this regard, note, for example, in FIG. 5 the passage 31 in the tip 20 and also the cupped shaped recess 32 that is adapted to conform in shape to the cupped member 26. The hole 31 in the tip 20 is not threaded.

The spring 24 is adapted to urge the member 26 against the cupped recess 32 of the tip 20. The cupped member 26 essentially forms a nut in which the screw 30 is adapted to engage therewith. The cupped member 26, once the screw 30 is engaged therewith essentially clamps the tip 20 between the member 26 and the body 22.

It is to be noted that with the tool of the present invention, access is quite limited to the rear of the tool which is the side where the tip is to be supported. In accordance with the present invention it is thus possible to be able to remove the tip essentially from the front side where the screw 30 is accessible. Also note in, for example, FIG. 2B a further hole 35 through which a pencil or the like member such as illustrated at 36 may extend to push the spring upwardly when the screw 30 has been disengaged to enable ready removal of the carbide tip 20. In this regard, note that in the normal biased position of the spring 24 the member 26 is biased into the recess 32. The item 36 through the hole 35 can simply be used to push the spring 24 up so that the cupped member 26 is urged out of the recess 32 so that the carbide tip 20 can be more readily removed.

If one desires to replace the tip 20 then all that is required is that the screw 30 be removed so that it no longer engages with the member 26. A pencil or the like can then be inserted through the hole 35 to lift the spring 24. The carbide tip 20 can then be removed and another tip can be inserted in its place. All this can be carried out without the requirement of removing the entire holder from the machine.

Once the new tip is in place or a re-ground tip is in place then the screw 30 is again engaged with the cupped member 26 and when the screw is completely tightened there is a positive interlocking between the body 22 and the cupped member 26 so that the carbide tip 20 is firmly in position within the ledge provided on the holder 22 that is adapted to receive the tip.

Thus, it is noted that in accordance with the present invention ready acess is provided for removal of the carbide tip. This access is at the front of the apparatus and does not require that one have to have access at the rear because with this particular product the access at the rear of the apparatus is quite restricted. The concepts are carried out at least in part with the use of the spring 24 and cupped member 26 that provides the dual use of providing an initial biasing retaining by virtue of the bias in the spring 24 along with a permanent securing by virtue of engagement between the screw 30 and the member 26.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. Tool apparatus having a replaceable cutting tip and comprising, a solid body of generally elongated shape having opposite ends including an end for supporting the body and an end for supporting the cutting tip, said solid body also having opposite sides including means at one side for receiving said cutting tip, said cutting tip having a through hole, said body also having a through hole adapted to be in alignment with the cutting tip through hole, and fastening means passing through said hole extending between said opposite sides and including oppositely-disposed mateable one and other fastening members, means for supporting said one fastening member on said one side, said other fastening member adapted to mate with said one fastening member to retain said cutting tip in the body, said means for supporting said one fastening member comprising a cantilever leaf means having spacedly disposed ends extending in a direction longitudinally of the elongated solid body, and including one end fixed to said body in a position remote from said other fastening member, and another end at which said one fastening member is supported.

2. Tool apparatus as set forth in claim 1 wherein said one fastening member includes a cupped nut means.

3. Tool apparatus as set forth in claim 2 wherein said cutting tip has a cupped recess at said through hole for receiving said cupped nut means.

4. Tool apparatus as set forth in claim 3 wherein said other fastening member comprises a screw means passing through the cutting tip hole to engage in said cupped nut means.

5. Tool apparatus as set forth in claim 1 wherein said cutting tip is of generally rectangular shape.

6. Tool apparatus as set forth in claim 1 wherein said cutting tip is of generally diamond shape.

7. Tool apparatus as set forth in claim 1 wherein said cantilever leaf means includes a deflectable cantilever member biased to urge the one fastening member against said cutting tip.

8. Tool apparatus as set forth in claim 7 wherein said one fastening member and its support means are unitarily formed with said one fastening member and other fastening member comprised of a nut and screw combination.

9. Tool apparatus as set forth in claim 8 wherein said one fastening member has a surface configuration adapted to mate with a similar surface configuration on the cutting tip.

10. Tool apparatus as set forth in claim 1 wherein the tool cross-dimension is on the order of 5/16".

11. Tool apparatus as set forth in claim 7 wherein the tool cross-dimension is on the order of 5/16".

12. Tool apparatus having a replaceable cutting tip and comprising, a solid body of generally elongated shape having opposite ends including an end for supporting the body and an end for supporting the cutting tip, said solid body also having opposite sides including means at one side for receiving said cutting tip, said cutting tip having a through hole, said body also having a through hole adapted to be in alignment with the cutting tip through hole, and fastening means passing through said hole extending between said opposite sides and including oppositely disposed mateable one and other fastening members, means for supporting said one fastening member on said one side, said other fastening member adapted to mate with said one fastening member to retain said cutting tip in the body, said means for supporting said one fastening member comprising spring-biased support means having one end fixed to said body and another free end at which said one fastening member is supported, said one fastening member including a cupped nut means, said cutting tip having a cupped recess at said through hole for receiving said cupped nut means, said other fastening member comprising a screw means passing through said cutting tip hole to engage in said cupped nut means, said body has a passage extending between said opposite sides for receiving means to deflect said spring-biased support means.

13. Tool apparatus as set forth in claim 12 wherein said spring-biased support means includes an elongated leaf secured by a rivet means at one end to the body.

14. Tool apparatus having a replaceable cutting tip and comprising, a solid body of generally elongated shape having opposite ends including an end for supporting the body and an end for supporting the cutting tip, said solid body also having opposite sides including means at one side for receiving said cutting tip, said cutting tip having a through hole, said body also having a through hole adapted to be in alignment with the cutting tip through hole, and fastening means passing through said hole extending between said opposite sides and including oppositely-disposed mateable one and other fastening members, means for supporting said one fastening member on said one side, said other fastening member adapted to mate with said one fastening member to retain said cutting tip in the body, said body having a passage extending between said opposite sides for receiving means to deflect said means for supporting said one fastening member.

15. A tool apparatus as set forth in claim 14 wherein said means for supporting said one fastening member comprises an elongated leaf fixedly secured by retaining means at one end to said body.

16. A tool apparatus as set forth in claim 15 wherein said body passage is disposed in the body at a position intermediate the ends of the cantilever member.

17. A tool apparatus as set forth in claim 16 wherein said cantilever member is also of elongated shape extending parallel with said body.

18. A tool apparatus as set forth in claim 17 wherein said tip and said mating member of the one fastening member have commonly interlocking configuration surfaces, said cantilever member biasing its supported mating member to interlock with said tip in the normal rest position of said cantilever member to provide proper positioning and limited retention of said cutting tip.

19. Tool apparatus having a replaceable cutting tip and comprising: a body of generally elongated shape having opposite ends, including an end for supporting the body and an end for supporting the cutting tip, said body also having opposite sides including one side for receiving said cutting tip, both said cutting tip and body having aligned respective holes, and fastening means passing through said holes and including oppositely-disposed one and other fastening members, said one fastening member being disposed on said one side and including a mating member supported by a cantilever member that biases said mating member toward said body, said centilever member having one free end thereof supporting said mating member and another end fixed to said body at a position longitudinally displaced from said aligned holes, said other fastening member also having a mating member adapted to engage with the mating member of said one fastening member to retain said cutting tip in the body.

20. Tool apparatus as set forth in claim 19 wherein said cantilever member comprises an elongated leaf secured to said body at a position displaced from said aligned holes that is greater than the width of said body at said aligned holes.

21. Tool apparatus as set forth in claim 20 wherein said elongated leaf is secured to said body by a rivet means.

22. Tool apparatus as set forth in claim 19 wherein said body has a passage extending between said opposite sides for receiving means to deflect said cantilever member.

23. Tool apparatus as set forth in claim 22 wherein said body passage is disposed in the body at a position intermediate the ends of the cantilever member.

24. Tool apparatus as set forth in claim 19 wherein said cantilever member is also of elongated shape extending parallel with said body.

25. Tool apparatus as set forth in claim 19 wherein said tip and said mating member of the one fastening member have commonly interlocking configuration surfaces, said cantilever member biasing its supported mating member to interlock with said tip in the normal rest position of said cantilever member to provide proper positioning and limited retention of said cutting tip.

26. Tool apparatus as set forth in claim 25 wherein said interlocking surfaces include a cupped surface on the mating member cooperating with a cupped recess in the cutting tip.

27. Tool apparatus as set forth in claim 26 wherein said cupped surface and recess are in alignment with said through holes.

28. Tool apparatus as set forth in claim 27 wherein said other fastening member comprises a screw means passing through said through holes to engage with said mating member of said one fastening member.

29. Tool member as set forth in claim 25 wherein said body has a passage extending between said opposite sides for receiving means to deflect said cantilever member to move said cantilever member away from its rest position to enable removal of said cutting tip.

* * * * *